Figure 1:
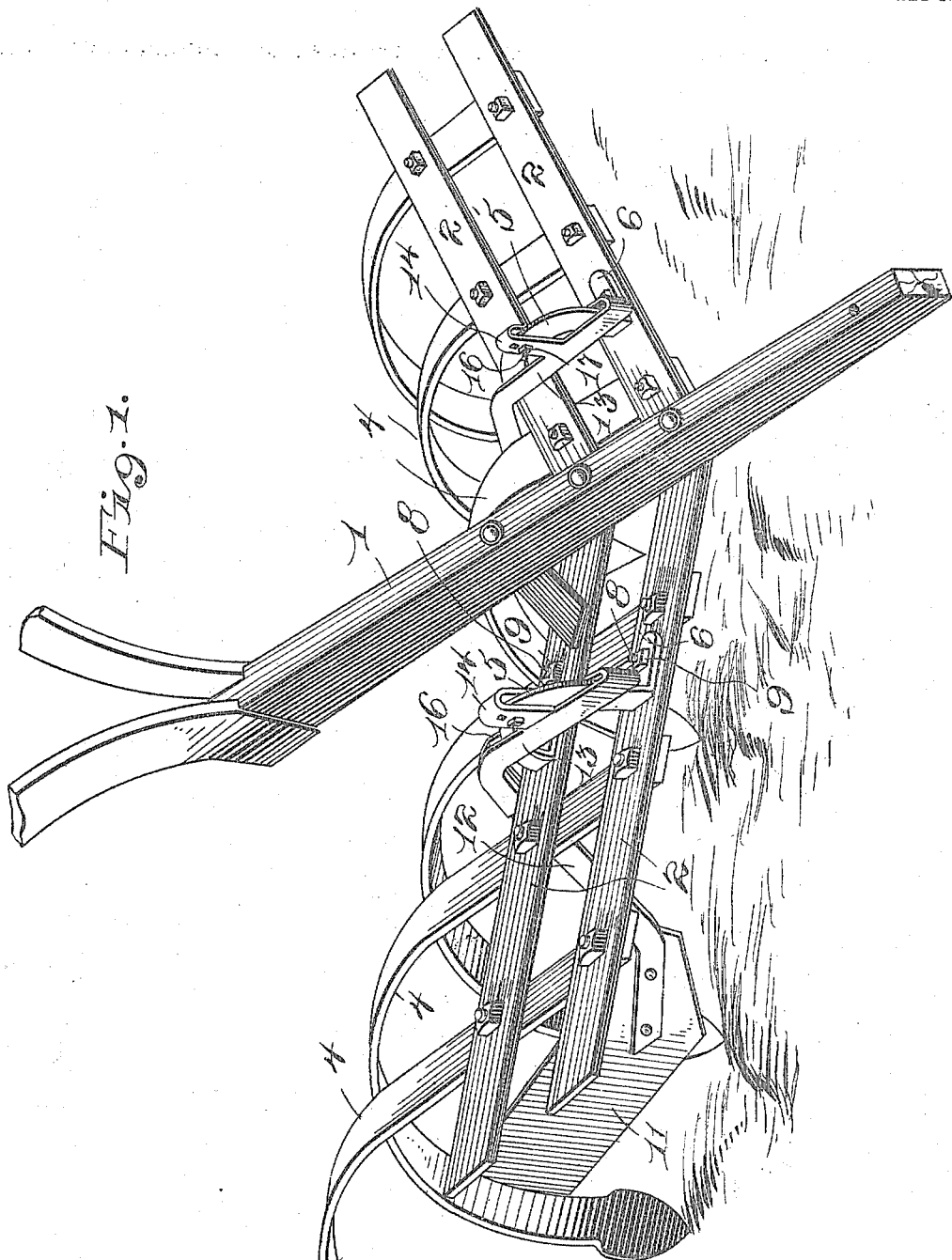

F. G. & G. C. MALCOM.
PLOW ATTACHMENT.
APPLICATION FILED OCT. 13, 1909.

951,737.

Patented Mar. 8, 1910.
2 SHEETS—SHEET 1.

Witnesses

Inventors
Fred G. Malcom
and George C. Malcom
By E. E. Vrooman,
his Attorney.

F. G. & G. C. MALCOM.
PLOW ATTACHMENT.
APPLICATION FILED OCT. 13, 1909.
951,737.
Patented Mar. 8, 1910.
2 SHEETS—SHEET 2.
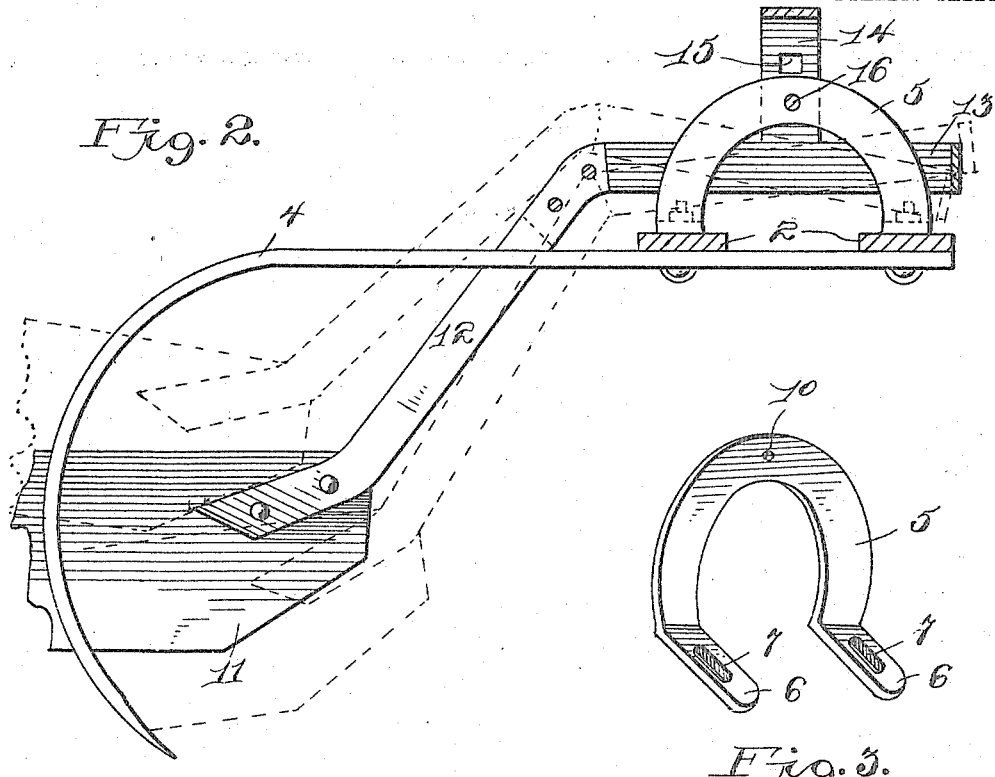
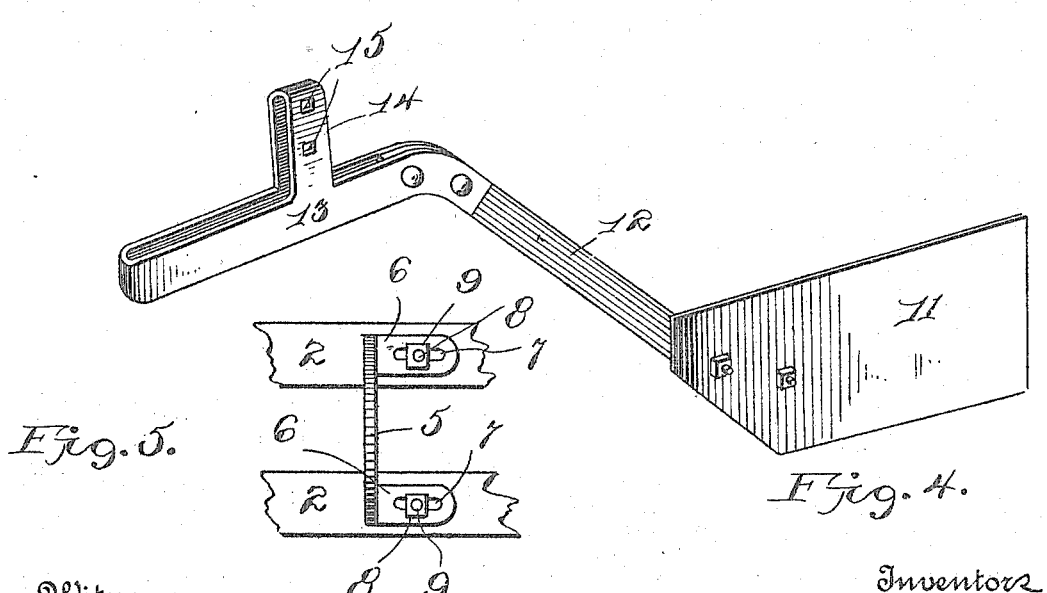
Witnesses
Inventors
Fred G. Malcom
George C. Malcom.
By E. E. Vrooman,
his Attorney.

UNITED STATES PATENT OFFICE.

FRED G. MALCOM AND GEORGE C. MALCOM, OF MONROE, GEORGIA.

PLOW ATTACHMENT.

951,737.  Specification of Letters Patent.  Patented Mar. 8, 1910.

Application filed October 13, 1909. Serial No. 522,446.

*To all whom it may concern:*

Be it known that we, FRED G. MALCOM and GEORGE C. MALCOM, citizens of the United States of America, residing at Monroe, in the county of Walton and State of Georgia, have invented certain new and useful Improvements in Plow Attachments, of which the following is a specification, reference being had therein to the accompanying drawing.

This invention relates to agricultural machines, such as cultivators, harrows, plows and the like, and the principal object of the same is to provide a fender therefor which may be readily attached to, or removed from the machine and which may be adjusted in accordance with the depth of the cut of the machine.

In carrying out the objects of the invention generally stated above it will be understood, of course, that the essential features thereof are necessarily susceptible of changes in details and structural arrangements, one preferred and practical embodiment of which is shown in the accompanying drawings, wherein:—

Figure 1 is a perspective view of an agricultural machine of the harrow type, showing the same equipped with a pair of fenders constructed in accordance with this invention. Fig. 2 is a fragmentary vertical sectional view taken on the line 2—2, Fig. 1. Fig. 3 is a detail perspective view of the fender support. Fig. 4 is a similar view of the improved fender. Fig. 5 is a top plan view of the fender support, showing the manner of adjustably mounting the same on a machine.

Referring to said drawings, it will be observed that the improved fender has been shown in connection with a harrow, the beam 1 of which has two pairs of oppositely projecting parallel bars 2 for the teeth 4. Two fenders have been shown, one on each side of the beam 1, but as the same are duplicates in every respect, it is thought a detailed description of one will suffice.

A vertically arranged semicircular flattened bar 5 has its ends 6 projected at right angles and provided with a slot 7 by means of which said bar 5 may be arranged transversely of the bars 2 with its ends 6 adjustably and detachably fastened thereto by means of the bolts and nuts 8—9. A transverse pivot opening 10 is formed through the upper portion of said bar 5.

The fender comprises a wide flat plate 11, which has an upwardly inclined arm 12 projecting from one corner thereof. The outer end of said arm is fastened between the ends of a flattened U-shaped bar 13, said bar being provided with a substantially U-shaped lateral extension 14 the side members of which are provided with oppositely disposed openings 15.

In assembling the improved fender, the U-shaped bar 13 is fitted horizontally over the semicircular bar 5, with the U-shaped extension 14 fitting vertically over said bar 5, and said bar 5 and the extension 14 are locked together in the desired adjusted position by means of a bolt 16 passed through the alined opening 15 of the extension 14 and the openings 10 of the bar 5. A lock nut 17 is employed for rigidly but detachably holding said bolt in a bar and extension locking position.

Preferably the bar 13 and extension 14 are integral.

It will be seen from the foregoing that the described manner of adjustably connecting the fender to the bar 5 provides a readily separable connection, and as the bar 13 and extension 14 surround said bar 5, lateral movement of the fender is prevented. And it will also be seen that as the bar 5 may be adjusted horizontally on the bars 2, and the bar 13 may be adjusted vertically on the bar 5, the fender may be adjusted both vertically and horizontally relatively to the teeth.

What we claim as our invention is:—

1. In a device of the character described, the combination with a machine having parallel tooth bars, of a semicircular vertically arranged bar adjustably connected thereto, a U-shaped bar fitted horizontally over said semicircular bar and provided with a U-shaped extension fitted vertically over the same, means for holding said extension and semicircular bar in adjustable relation, and a fender plate projecting from said U-shaped bar.

2. An agricultural machine comprising a beam, tooth bars carried thereby, teeth carried by said bars, a semicircular vertically arranged bar horizontally adjustable on said bars, a fender arm having a vertically adjustable connection with said semicircular bar, and a fender plate carried by said arm.

3. An agricultural machine comprising teeth bars, teeth carried thereby, a semicircular bar having outturned ends adjustably connected to said teeth bars, a fender plate, an arm therefor, and means for adjustably connecting said arm to said semicircular bar.

In testimony whereof we hereunto affix our signatures in presence of two witnesses.

FRED G. MALCOM.
GEORGE C. MALCOM.

Witnesses:
J. L. STEWART,
J. R. RADFORD.